United States Patent [19]

Arai et al.

[11] 3,717,923

[45] Feb. 27, 1973

[54] METHOD AND AN APPARATUS FOR MANUFACTURING A TAPE CASSETTE

[75] Inventors: Kinjiro Arai, Yoshio Nakatani, both of Yokohama, Kanagawa-ken, Japan

[73] Assignee: Victor Company of Japan, Ltd., Yokohama, Kanagawa-ken, Japan

[22] Filed: Feb. 5, 1971

[21] Appl. No.: 112,871

[30] Foreign Application Priority Data

Feb. 7, 1970 Japan ....................45/10378

[52] U.S. Cl. ....................29/429, 29/208 D

[51] Int. Cl. ....................B23p 19/00, B23p 19/04

[58] Field of Search ........29/200 B, 429, 433, 208 D, 29/200 D, 241, 203 R, 421

[56] References Cited

UNITED STATES PATENTS

| | | | |
|---|---|---|---|
| 3,248,789 | 5/1966 | Seaman | 29/421 X |
| 3,392,433 | 7/1968 | Teraoka | 29/241 X |
| 3,500,528 | 3/1970 | Maguire | 29/208 D |
| 3,605,250 | 9/1971 | Maguire | 29/429 |

*Primary Examiner*—Thomas H. Eager
*Attorney*—Holman & Stern

[57] ABSTRACT

A method for manufacturing a tape cassette comprises the process steps of pulling a tape leader out of a tape cassette case, cutting off the pulled out tape leader, jointing one end of the cut off tape leader piece and one end of a magnetic tape, winding a predetermined length of the magnetic tape thus jointed into a spool provided in the cassette case, jointing the other cut off tape leader piece and the other end of the magnetic tape and winding up the whole magnetic tape and the tape leader piece into the cassette case. A winding of the magnetic tape is placed outside of the cassette case and the magnetic tape is supplied to the spool in the cassette case from outside during the winding process. An apparatus for manufacturing a tape cassette carries out the above listed steps of the aforementioned manufacturing method.

10 Claims, 7 Drawing Figures

METHOD AND AN APPARATUS FOR MANUFACTURING A TAPE CASSETTE

BACKGROUND OF THE INVENTION

1. Field of the Invention

This invention relates to a method and an apparatus for manufacturing a tape cassette and more particularly to a method and an apparatus for automatically manufacturing a tape cassette containing a winding of magnetic tape therein, by supplying the magnetic tape from outside of a cassette case and winding it up in the cassette case.

2. Description of the Prior Art

A tape cassette generally known as a compact cassette contains two rotatable spools and a magnetic tape of a predetermined length both ends of which are fixed to said rotatable spools. In a conventional method for manufacturing a tape cassette, spools on which predetermined length of magnetic tape is wound are prepared and assembled into a cassette case. The magnetic tape is fixed at one end to one spool through a tape leader piece and at the other end to the other spool through another piece of tape leader.

Spools used for the tape cassette are generally not of a type such as an open reel type which has reel flanges but of a type which simply consists of a reel hub. As a result, the winding of the magnetic tape of a predetermined length wound on a spool is apt to loosen with the result that handling and transfer thereof require an extreme care. It is, therefore, very troublesome and inefficient to assemble the two spools and the winding of the magnetic tape wound on one of the spools into the cassette case. Besides, the fact that the winding of the magnetic tape is apt to loosen has made an automatic assembling of the spools and the winding of the magnetic tape extremely difficult and impracticable.

SUMMARY OF THE INVENTION

It is, therefore, a general object of this invention to provide a novel and economical method for manufacturing a tape cassette eliminating the aforementioned disadvantages of the conventional method.

Another object of the invention is to provide a method for manufacturing a tape cassette according to which a magnetic tape is supplied from outside into a tape cassette case in which spools and tape leaders are previously contained and the tape is drawn into the case from without. This obviates the necessity for assembling the winding of the magnetic tape wound on the spool into the tape cassette case. Accordingly, there is no likelihood of the winding of the magnetic tape loosening in assembling and transferring which has often been the case with the conventional methods.

A further object of the invention is to provide a method and an apparatus for carrying out the method for automatically manufacturing a tape cassette according to which, winding of the magnetic tape into the tape cassette can be automatically and continuously carried out.

A still further object of the invention is to provide a method for manufacturing a tape cassette in which a cassette discrimination and identification symbol can be stamped immediately before the magnetic tape is supplied into the tape cassette case.

BRIEF DESCRIPTION OF THE DRAWING

Other objects and features of the invention will become more apparent from the description made hereinbelow with reference to the accompanying drawings, in which.

DESCRIPTION OF PREFERRED EMBODIMENT

Figure 1:
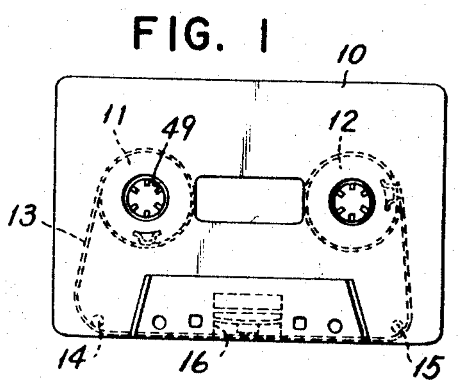
FIG. 1 is a top plan view of a tape cassette case which is to be subjected to the manufacturing process according to the invention.

One embodiment of a method for manufacturing a tape cassette according to the invention will now be schematically and sequentially illustrated referring to FIGS. 1 to 5. In FIG. 1, the casing of a tape cassette in which magnetic tape is to be wound up by the method according to the invention is shown. The tape cassette casing 10 has two spools 11 and 12 rotatably mounted therein. A tape leader 13 is fixed at its ends to the spools 11 and 12 and is disposed along a predetermined path of the tape guided by guide pins 14 and 15. Accordingly, the tape leader 13 passes through a head engaging opening 16 provided at the front side of the case 10 between the guide pins 14 and 15.

Figures 2, 5:
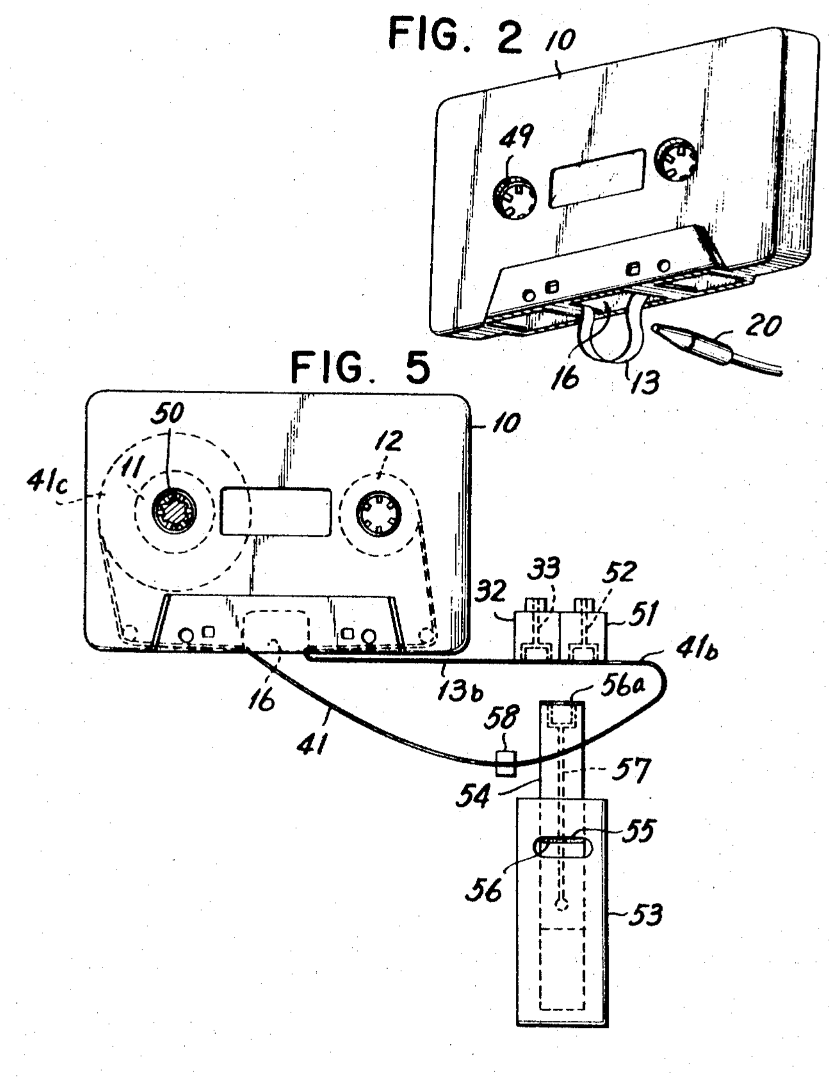
FIGS. 2 to 5 are respectively views which schematically illustrate the process steps of the method according to the invention in the order of their sequence.

A fore end of an air nozzle is directed, as shown in FIG. 2, toward the opening 16 of the tape cassette casing 10. When compressed air is injected from the air nozzle 20, a part of the tape leader 13 is dislodged and blown out of the cassette case 10 from the opening 16.

Figures 3, 4:
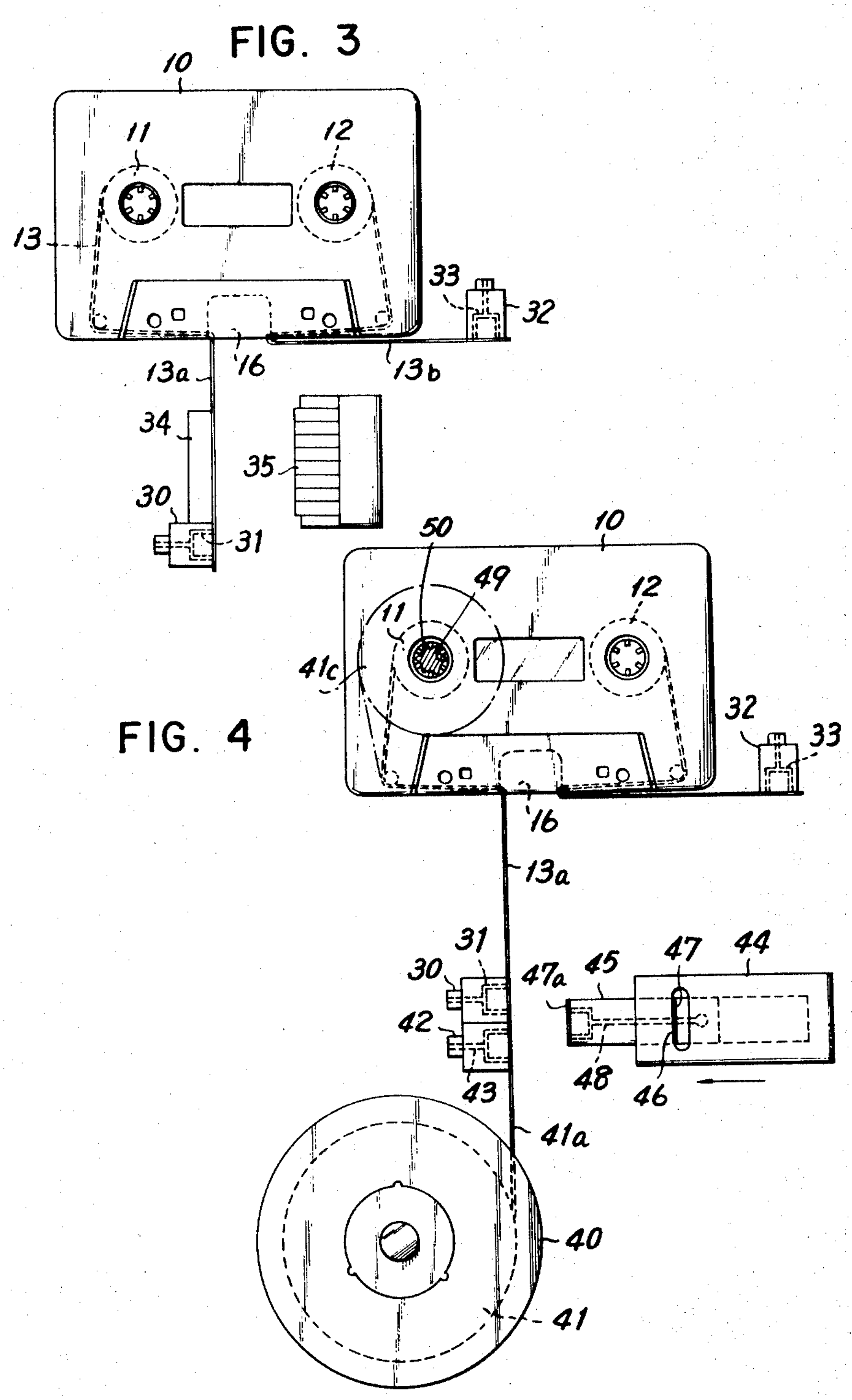

This dislodged tape leader 13 is further pulled out of the cassette case 10 and then cut in the middle. As shown in FIG. 3, one tape leader piece 13a thus cut off is held to a tape leader holder 30 by suction of a vacuum sucking aperture 31 formed therein. The other tape leader piece 13b is similarly held to a tape leader holder 32 by suction of a vacuum sucking aperture 32 formed therein. A cushion 34 is placed on one side of the tape leader piece **13*a* and a tape identification symbol is stamped on the other side by a stamper 35**.

Then, as shown in FIG. 4, a recorded or unrecorded magnetic tape 41 which is wound on a reel 40 is held at its end portion 41a to a tape holder 42 by suction of a vacuum sucking aperture 43. The tip of the tape end portion **41*a* thus held to the tape holder 42 is brought into contact with the tip of the tape leader piece 13*a* held to the tape leader holder 30. A punch 45 of a splicing tape puncher 44 moves in a sliding motion to the left as shown in the figure and punches out a splicing tape 47 in cooperation with a die 46. The punch 45 moves further to the left while holding thereon a punched out splicing tape piece 47*a* attached thereto by a suction of a vacuum sucking aperture 48 and causes the splicing tape piece 47*a* to adhere to the contacting portions of the tape leader piece 13*a* and the tape end 41*a*. Thus the tape leader piece 13*a* and the magnetic tape 41** are jointed to each other.

After the foregoing processes, a spool drive shaft 50 is fitted into a central aperture 49 of the spool 11. By the rotation of the drive shaft 50, the spool 11 is rotated in a clockwise direction in the figure whereby the tape leader piece 13*a* and the magnetic tape 41 are wound on the spool. The magnetic tape 41 fed from the reel 40, enters into the cassette case 10 from the opening 16 of the case and is taken up by the spool 11. When a predetermined length of the magnetic tape 41 has been taken up by the spool 11 to form a winding 41*c* of the magnetic tape, the magnetic tape 41 is cut off.

As shown in FIG. 5, a cut end portion 41*b* of the magnetic tape is held to a tape holder 51 by suction of a vacuum sucking aperture 52 formed therein. The tip of the tape end portion 41*b* thus held to the holder 51 is brought into contact with the tip of the tape leader piece 13*b* held on the holder 32. A punch 54 of a splicing tape puncher 53 punches out a splicing tape 56 in cooperation with a die 55. The punch 54 moves in a sliding motion while holding a punched out splicing tape piece 56*a* thereon by a suction of a vacuum sucking aperture 57 and causes the splicing tape piece 56*a* to adhere on the contacting portions of the tape leader piece 13*b* and the tape end portion 41*b*. By this process, the tape leader piece 13*b* and the magnetic tape 41 are jointed each other. In jointing the tape leader piece 13*b* and the magnetic tape 41, a loop of the magnetic tape 41 is displaced by a tape displacing mechanism 58 so as not to obstruct the sliding movement of the punch 54.

Upon completion of the jointing of the tape leader piece 13*b* and the tape end portion 41*b*, the spool 11 is further rotated in a clockwise direction by the spool drive shaft 50. The end portion 41*b* of the magnetic tape 41 and the tape leader piece 13*b* which have been left outside of the cassette case 10 are pulled into the case 10 and wound over the winding 41*c* of the magnetic tape by the rotation of the spool 11. Thus, the whole tape is wound into the case 10 and contained therein.

By the series of process steps described above, the magnetic tape 41 of a predetermined length is wound up in a state in which both ends thereof are fixed to the spools provided in the case 10 through the tape leader pieces, whereby the manufacture of the tape cassette is completed.

As described above, the magnetic tape is wound into the cassette case from outside of the case during manufacturing process. Accordingly, the assembling of the preformed winding of the magnetic tape wound on the spool into the cassette case as practised in the conventional art has completely been obviated. This has eliminated the likelihood of the winding of the magnetic tape being loosened and ravelled during transfer or assembling. Furthermore, since in the method according to the invention the discriminating symbol can be stamped to the magnetic tape immediately before the magnetic tape is wound into the cassette case, the production rate is improved.

One embodiment of the apparatus for manufacturing a tape cassette to which the foregoing manufacturing method is applied and which is capable of manufacturing the tape cassettes automatically and continuously will be illustrated with reference to FIGS. 6 and 7.

On a front panel 60 of the tape cassette manufacturing apparatus, there is provided a turntable 62 which is mounted on a shaft 61 for intermittent rotation. Four cassette holding jigs 63 are fixed to the turntable 62 and spaced from each other by 90°. A cassette supply case 64 holds a plurality of tape cassettes 65 which are of the same construction as the one shown in FIG. 1 and supplies the cassette 65 one by one to the cassette holding jig 63 at the lowermost position indicated by I in the figure.

To begin with one tape cassette 65 is supplied from the supply case 64 to the cassette holding jig 63 located at the position indicated by I in the figure. The tape cassette 65 is pushed into the jig 63 by means of a suitable pushing device (not shown). The jig 63 consists of side frames 66*a* and 66*b* and arms 68*a* and 68*b* respectively carrying vacuum shoes 67*a* and 67*b* at their fore ends. The arm 68*a* is normally bent at its middle portion at right angles about a shaft 69. Similarly, an end portion 66*c* of the frame 66*b* is to swivel about a shaft 70.

Figure 6:
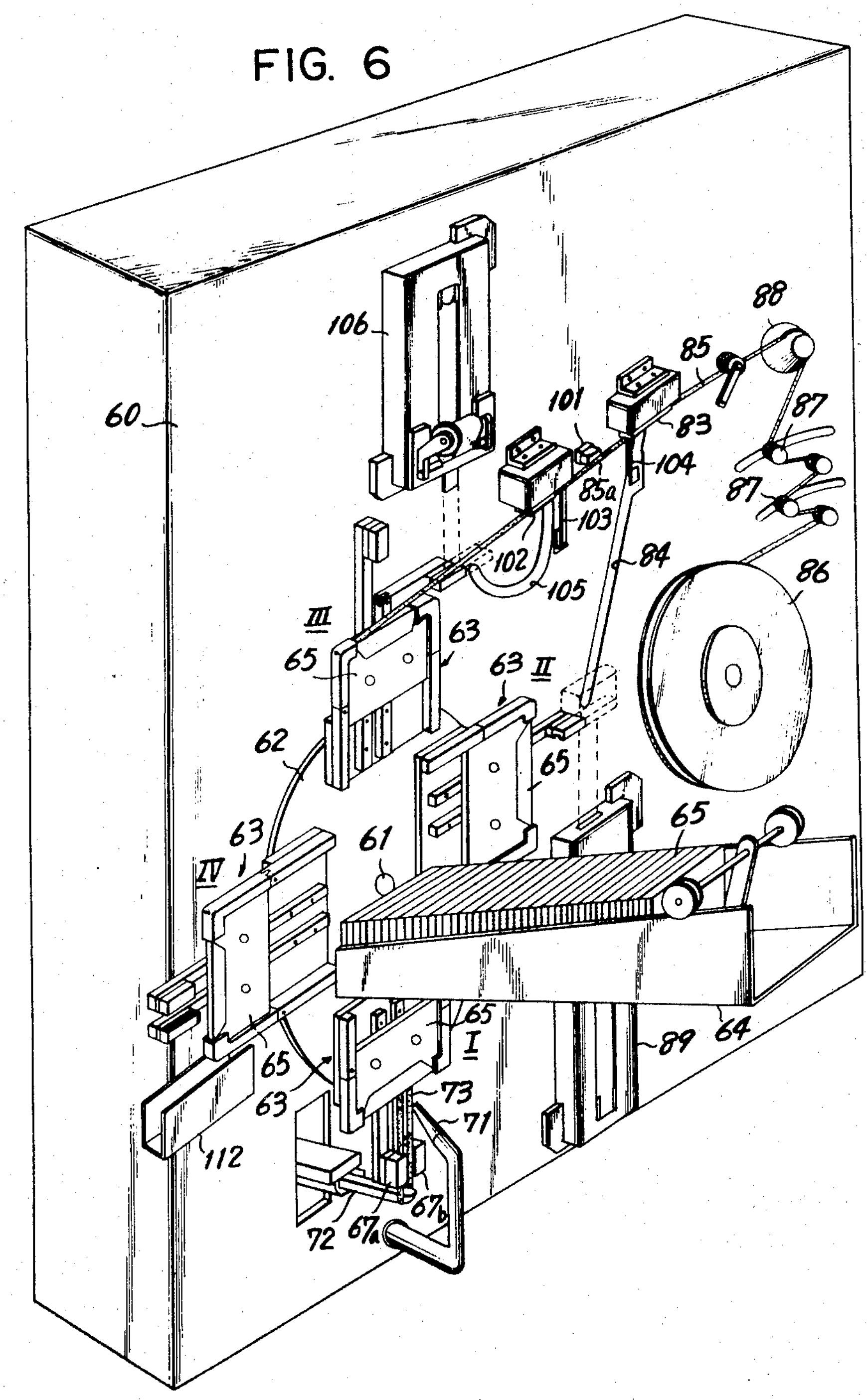
FIGS. 6 and 7 are respectively a perspective view and a front view of one embodiment of the apparatus for manufacturing a tape cassette in which a method according to the invention is automatically carried out.
Figure 7:
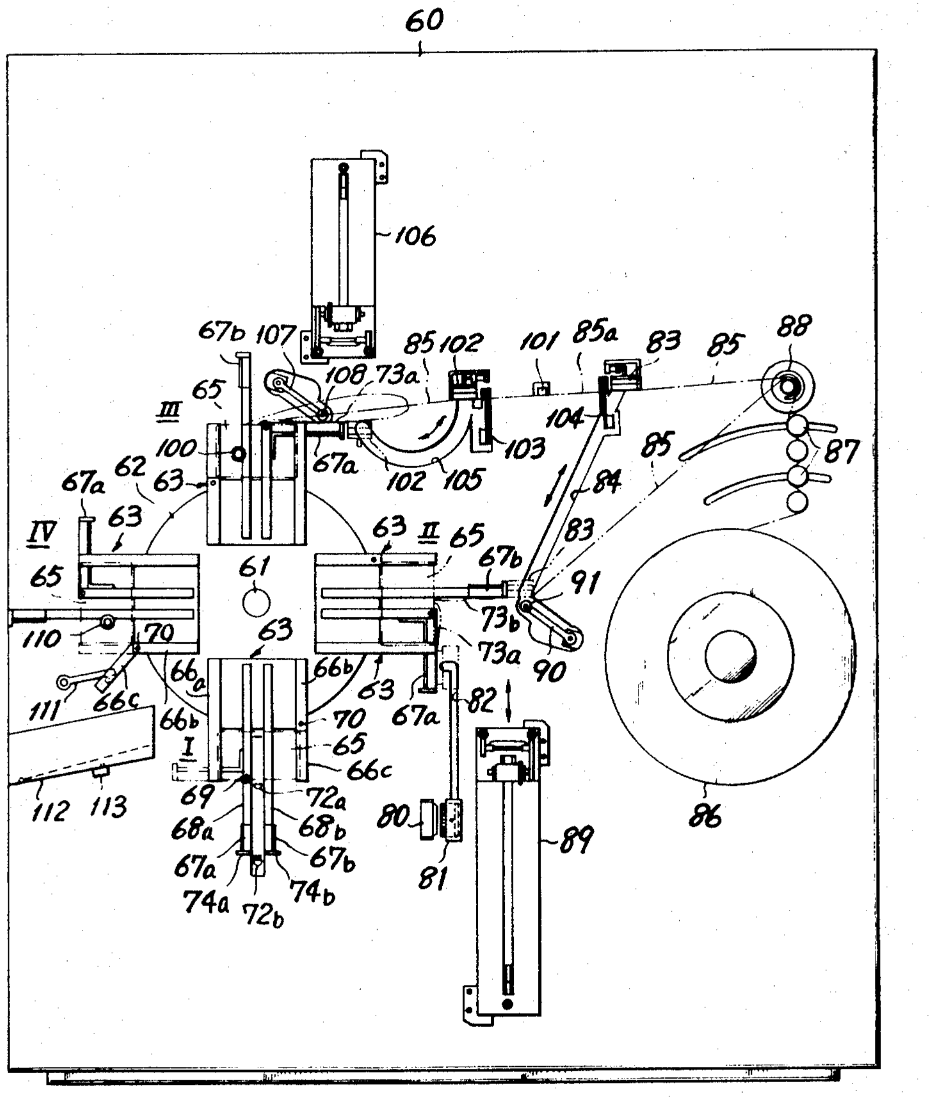

When the tape cassette 65 has completely been inserted in the jig 63, air is injected from a fore-end of an air nozzle 71 as shown in FIG. 6 to the head engaging opening formed in the front side of the cassette 65. This causes a part of the tape leader to be dislodged and blown out of the cassette as illustrated with reference to FIG. 2. A lever 72 for pulling out the leader projects from the panel 60 and moves downwardly from the position indicated as 72*a* to the position indicated as 72*b* pulling a leader 73 out of the cassette 65. As the lever 72 moves downwardly, the swingable end portion of the arm 68*a* rotates around the shaft 69 from the position indicated by the chain line to the position indicated by the full line. When the lever 72 has moved to the position indicated as 72*b*, shearing edges provided on the lever 72 open outwardly to cut off the leader 73 in cooperation with edges 74*a* and 74*b* provided on the lower ends of the vacuum shoes 67*a* and 67*b*. Since the leader 63 is held to the vacuum shoes 67*a* and 67*b* by suction before the leader 73 is cut off, cut off leader pieces 73*a* and 73*b* remain attracted to the vacuum shoes 67*a* and 67*b*. The lever 72 retracts into the panel 60 after the leader 73 is cut off and, at the same time, the swingable end portion of the arm 68*a* returns by a pivotal motion to its position shown by the chain line.

Then, the turntable 62 rotates by 90° bringing the jig 63 to a position indicated by II. A stamp 81 which is supplied with ink on a stamp pad 80 slides along a groove 82 and stamps a discriminating and identifying symbol on the leader piece 73*a* held in position by the vacuum shoe 67*a*.

Simultaneously with the operation, a slide vacuum shoe 83 slides along a groove 84 to the position shown by broken line. The slide vacuum shoe 83 holds by suction the end portion of a magnetic tape 85 on which a certain programme such as music may have been recorded. The magnetic tape 85 is wound on a reel 86 and runs along tension rollers 87 and a drive roller 88 to the vacuum shoe 83. When the vacuum shoe 83 holding the magnetic tape 85 reaches the position shown by the broken line, the ends of the leader piece 73*b* and the magnetic tape 85 come into contact with each other.

Then a splicing tape puncher 89 which is of a similar construction to the puncher 44 illustrated with reference to FIG. 4 is actuated. The punch of the puncher 89 moves upwardly with a splicing tape piece attached thereto in the same manner as in the puncher 44 and causes the splicing tape piece to be applied to the end portions of the leader piece 73*b* and the magnetic tape 85 which are positioned on the vacuum shoes 67*b* and 83. After this operation, a roller 91 provided on the end portion of an arm 90 rolls over the adhered splicing tape piece by movement of the arm 90 thereby making the joint between the leader piece 73*b* and the end portion of the magnetic tape 85 tighter. The shoe 83 ceases its vacuum suction when the aforementioned joint is completed and returns to its original position.

The turntable 62 rotates again by 90° to bring the jig 63 to a position indicated by III. In this position, the vacuum shoe 67*b* ceases its suction. A spool drive shaft 100 fits into the central aperture of a spool to which the end of the leader piece 73*b* is fixed to rotate this spool. By the rotation of this spool, the leader piece 73*b* and the magnetic tape 85 jointed thereto are wound into the cassette 65.

When a predetermined length of the magnetic tape 85 supplied from the reel 86 has been wound into the cassette 65, a detection signal which is recorded at a predetermined position on the magnetic tape 85 reaches a position where a detecting magnetic head 101 is located. In the present embodiment, a signal of a very low frequency of 12.5 Hz is used as the detection signal. During the winding of the magnetic tape into the cassette, the magnetic tape runs at a tape speed about 40 times as high as the normal recording and reproducing tape speed so that the detection signal is reproduced as a signal of about 500 Hz. Since a minimum frequency of the music programme signal recorded on the magnetic tape 85 is about 30 Hz, this minimum frequency is reproduced as a signal of 1200 Hz during the winding of the magnetic tape into the cassette. Hence, there is no likelihood of erroneous detection by the programme signal.

When the detecting magnetic head 101 has detected the detection signal, a turn vacuum shoe 102 an d the slide vacuum shoe 83 are actuated to hold the magnetic tape 85 by their vacuum suction. At the same time, cutters 103 and 104 are actuated to cut off a magnetic tape portion 85*a* between the shoes 102 and 83 on which the detection signal is recorded.

Then, the turn vacuum shoe 102 turns about half a turn along a groove 105 and reaches the position indicated by the broken line while holding the magnetic surface of the magnetic tape 85 thereto by its suction. This brings the end of the leader piece 73*a* held to the vacuum shoe 67*a* into contact with the end of the magnetic tape 85 held to the vacuum shoe 102. A splicing tape puncher 106 having a similar construction to the punchers 44 and 53 shown in FIGS. 4 and 5 is actuated. The punch of the puncher 106 moves downwardly while holding a splicing tape piece and causes the splicing tape piece to adhere to the end portions of the leader piece 73*a* and the magnetic tape 85 respectively held to the vacuum shoes 67*a* and 102. At this time, air is injected against the magnetic tape 85 to move it slightly aside so that the loop of the magnetic tape 85 will not prevent the jointing operation of the puncher 106. After this operation, a roller 108 provided on the end portion of an arm 107 rolls over the adhered splicing tape piece by movement of the arm 107 thereby making the joint between the leader piece 73*a* and the end portion of the magnetic tape 85 tighter. The shoe 102 ceases its vacuum suction when the aforementioned joint is completed and returns to its original position.

The turntable 62 rotates again by 90° to bring the jig 63 to a position indicated as IV. The shoe 67*a* ceases its vacuum suction. The spool drive shaft 110 further rotates the spool to wind a whole loop of the magnetic tape 85 and the leader piece 73*a* into the cassette case. A lever 111 is actuated to move the swingable frame portion 66*c* downwardly in a pivotal motion about the shaft 70. This releases the tape cassette 65 manufactured by the foregoing processes from the jig 63. The tape cassette 65 falls in a shoot 112 and is discharged from the apparatus. The shoot 112 is provided with a configuration switch 113. This switch 113 is closed when the cassette 65 falls in the shoot 112 whereby the release of the cassette 65 is confirmed.

After the aforementioned operation, the turntable 62 rotates again by 90° to bring the jig 63 which is now empty by releasing the cassette back to the position I.

The manufacture of the tape cassette is effected by the processes described above. On the turntable 62 there are mounted four jigs 63 and each of the above described operations is simultaneously effected in each position indicated as I to IV.

This invention is not limited to the above described embodiment but various variations and modifications can be made without departing from the scope and spirit of the invention.

What we claim is:

1. A method for manufacturing a tape cassette having a cassette-casing and two spools rotatably mounted therein and tape leaders fixed at their ends to said two spools, comprising: assembly said casing without the tape but containing a single tape leader of length substantially equivalent of a combined length of said two tape leaders; pulling and dislodging said tape leader out of the tape cassette casing; cutting the tape leader pulled out at substantially a middle portion thereof and forming two tape-leader pieces; respectively holding by a holding means the two tape leader pieces caused by said step of cutting; jointing firstly one tape leader piece held by said holding means and one end of a magnetic tape located externally of the cassette casing, rotating the first spool corresponding to said one tape leader and winding said one tape leader piece and said magnetic tape jointed together onto the first spool in the cassette case; cutting off the magnetic tape when a predetermined length of the magnetic tape has been wound on the first spool by said rotating and winding process; holding and jointing the end of the cut magnetic tape; further winding the jointed magnetic tape and the other tape leader piece on the first spool thereby winding up the whole tape leader and the magnetic tape into the tape cassette casing so as to provide a finished tape-cassette.

2. The method for manufacturing a tape cassette as defined in claim 1 which further comprises stamping a discriminating and identifying symbol on at least one of said tape leader pieces held by said holding means prior to jointing of an end of the magnetic tape and the tape leader piece.

3. The method for manufacturing a tape cassette as defined in claim 1 wherein said step of pulling out and dislodging the tape leader out of the casing comprises injecting air at an opening formed at a front side of the tape cassette-casing to blow the tape leader out of the casing and pulling out the tape leader thus blown out of the casing by a lever means.

4. The method for manufacturing a tape cassette as defined in claim 1 wherein said step of holding the two tape leader pieces comprises applying vacuum suction at apertures formed in vacuum shoes which respectively are disposed to hold the tape leader pieces in position.

5. An apparatus for manufacturing a tape cassette which comprises a tape cassette case having two spools rotatably mounted therein and a tape leader fixed at its both ends to said two spools, means for pulling said tape leader out of the tape cassette case, means for cutting off the tape leader pulled out by said tape leader pulling out means, means for respectively holding two tape leader pieces cut off by said tape leader cutting off means, a first jointing means for jointing one tape leader piece held by said holding means and the end of a magnetic tape, means for rotating the spool to which one end of said one tape leader piece is fixed thereby winding said one tape leader piece and said magnetic tape jointed together on the spool in the cassette case, means for supplying said magnetic tape from outside of the cassette case to the spool, means for cutting off the magnetic tape when a predetermined length of the magnetic tape has been wound on the spool by said rotating and winding means, a second jointing means for jointing the end of the magnetic tape cut off by said magnetic tape cutting off means and the other tape leader piece held by said holding means, and means for further winding the jointed magnetic tape and the other tape leader piece on the spool thereby winding up the whole tape leader pieces and the magnetic tape into the tape cassette case.

6. The apparatus for manufacturing a tape cassette as defined in claim 5 which further comprises means for stamping a discriminating symbol on at least either one of said tape leader pieces held by said holding means prior to jointing of the end of the magnetic tape and the tape leader piece.

7. The apparatus for manufacturing a tape cassette as defined in claim 5 wherein said tape leader pulling out means comprises an air nozzle for injecting air to an opening formed in the front side of the tape cassette case to blow the tape leader out of the tape cassette case and a lever means for engaging the tape leader thus blown out of the tape cassette case and further pulling it out.

8. The apparatus for manufacturing a tape cassette as defined in claim 5 which further comprises holding jigs for holding the tape cassette case and means for rotating the holding jigs intermittently between four stop positions, said tape leader pulling out means and said tape leader cutting off means being actuated at first stop position of the holding jigs, said first jointing means being actuated at second stop position, said rotating and winding means, magnetic tape supply means, magnetic tape cutting off means and second jointing means being actuated at third stop position and said whole tape winding up means being actuated at fourth stop position.

9. The apparatus for manufacturing a tape cassette as defined in claim 5 which further comprises holding jigs for holding the tape cassette case and means for rotating the holding jigs intermittently, said tape leader piece holding means consisting of vacuum shoes provided on said jigs and respectively holding the tape leader pieces by their vacuum sucking action.

10. The apparatus for manufacturing a tape cassette as defined in claim 5 which further comprises a magnetic head for detecting a detection signal, said magnetic tape having the detection signal recorded at a predetermined position thereon and said magnetic tape cutting off means consisting of tape cutters which are actuated when said detecting magnetic head has detected the detection signal recorded on the magnetic tape.

* * * * *